Oct. 3, 1967  E. L. NILSSON  3,345,094

LINK WITH A LINK LOCK, FOR EXAMPLE FOR OFFICE MACHINES

Filed Dec. 19, 1966

*INVENTOR.*
ERIC LENNART NILSSON

BY *Darby & Darby*

ATTORNEYS

United States Patent Office 3,345,094
Patented Oct. 3, 1967

3,345,094
LINK WITH A LINK LOCK, FOR EXAMPLE
FOR OFFICE MACHINES
Eric Lennart Nilsson, Karlshamm, Sweden, assignor to
Facit-Halda AB, a Swedish joint-stock company
Filed Dec. 19, 1966, Ser. No. 602,831
Claims priority, application Sweden, Dec. 20, 1965,
16,464/65
2 Claims. (Cl. 287—93)

ABSTRACT OF THE DISCLOSURE

The invention disclosed herein is a link for use for transmitting movement to a moving part of an office machine or the like, which link is provided with means for locking the bent-over end thereof in position in an aperture in the member to be operated thereby. The locking means consists of a resilient member having rectangular apertures therein, the member being bent into a generally V-shape and having a flat portion at the apex of the V which cooperates with a flatted portion on the round link rod to prevent turning movement of the member on the link rod. Additionally, the V-portion has extensions, one of which lies parallel to the body of the rod and perpendicular to the bent end thereof, with an aperture therein concentric with the aperture in the rod so that the link may be readily inserted through an aperture in the operated or operating member and locked therein by action of the resilient latch, the end of which snaps over the rod after the rod has been placed through the aperture in the operating member.

This invention relates to a link with a link lock, for use for example in office machines and comprises a link constituting a straight wire piece, for example a metal wire piece, having its end bent at a right angle to form a short guide pin.

The invention is characterized by a link lock mounted on the link and comprising a preferably resilient locking tongue or the like extending along the side of the link and so designed, that it is capable together with the link of embracing in a fork-like manner a member cooperating with the link, for example a plate with a hole into which the guide pin of the link is inserted. The invention further is characterized in that the link and the locking tongue are so designed such, that the locking tongue extends somewhat past the guide pin in the longitudinal direction of the link subsequent to the mounting of the link lock on the link, thereby rendering it possible to assemble the link and the link lock mounted thereon with a cooperating member without the help of a tool. The assemble of the link and the cooperating member the locking tongue of the link lock is pressed against the cooperating member, so that the locking tongue springs off the link, and the cooperating member can pass between the locking tongue and the outer end of the link guide pin to its final locking position. According to the invention, the link lock is advantageously adapted to be threaded onto the link which preferably is provided with one or several depressions or projections suitably pressed or punched and arranged such, that they fix the link lock in the longitudinal direction of the link subsequent to the mounting of the link lock on the link, and prevent the link lock from turning on the link, said link lock advantageously being designed as a single part, preferably by pressing and/or punching a wire or strip material, for example a steel strip.

The link and link lock according to the invention offer the advantage of quickly, easily, and reliably being mounted on and removed from the cooperating member and in a long series of applications to effect a fully satisfactory locking of the link mounted. Moreover. both the link and the link lock are relatively inexpensive to manufacture in series.

The accompanying drawing shows by way of example an embodiment of the invention.

Figure 1:
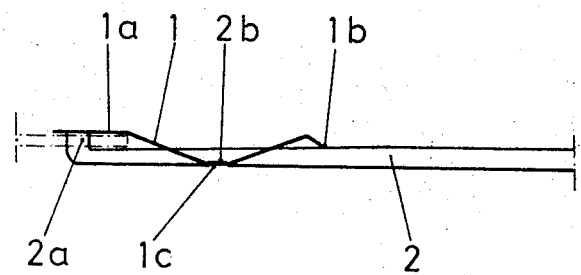
Figure 2:
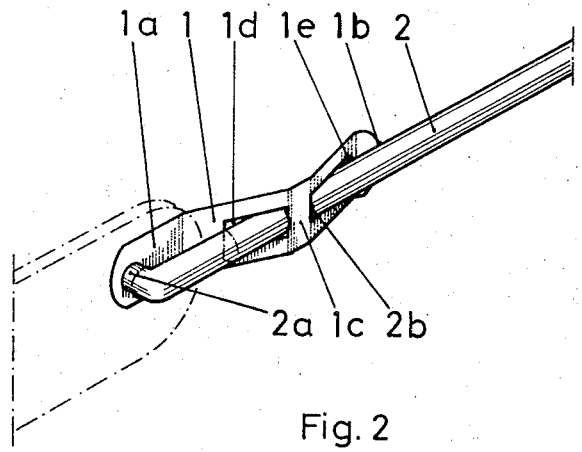

FIG. 1 is a side view of the link with the link lock,
FIG. 2 is a perspective view of the link with the link lock.

The link comprises a rod or wire 2 made of metal and bent at a right angle to form a short guide pin 2a, the bending preferably being made with the smallest possible bending radius, thereby giving the guide pin 2a a good bearing surface. The link lock is a leaf spring 1 of steel sheet metal or the like, with a V- shaped bend into the flanks of which rectangular holes 1d and 1e are punched with a plane portion 1c between the two holes of the link lock adjusted to fit into a depression 2b on the link, so that the link lock is held fixed in the axial direction of the link. The tongue 1a on the link lock extends parallel to the link 2 and lies flat against to the outer end surface of the guide pin 2, so that the tongue and the link enclose in a fork-like manner a member 3 which cooperates with the link and which is indicated by dash-dotted lines in the drawing to be a plate with a hole into which the guide pin 2a of the link is inserted.

At its end facing away from the tongue 1 the link lock is formed with a bend which with its edge surface 1b rests inclined on the link 2.

Whilst the wire is being bent for forming the guide pin 2a, the said pin at the same time is flattened on the inside of the bend, and on this surface rests an edge of the rectangular opening 1d; so that the link lock is prevented from turning on the link.

The link lock is designed such, that it can be placed on the link only by resiliently bending the lock so that the link lock is retained on the link by its own spring force when released.

The locking tongue of the link can be advantageously provided with a relatively large diameter hole concentric with the guide pin.

What I claim is:
1. A link and link lock for use in office machines and the like, comprising, in combination, a rod having a right angle bend at one end thereof, a portion at one end of said bend being short and adapted to be inserted in an aperture in which said link is to be locked, a locking clip comprising a tongue portion at one end parallel to said rod and extending perpendicularly to said short portion and having an aperture therein concentric with said rod end and receiving said short portion therethrough, a V-shaped portion extending from said tongue portion and having a flat portion at the base of said V, the legs of said V having rectangular apertures therein through which said rod extends, a flat portion on said rod, said flat portion at the base of said V engaging with said flat rod portion to prevent said clip from rotating with respect to said rod, and an inclined portion at the other end of said clip extending from the leg of said V remote from said tongue portion and lying substantially parallel to the leg of said V adjacent said tongue portion, said clip being resilient and being held on said rod by virtue of tension exerted against said rod by the base of said V and the edges of said rectangular apertures.

2. A link and link lock as claimed in claim 1 wherein said tongue portion extends beyond said short bent portion of said rod forming a lip which can be engaged by the operating member to thereby move said tongue away from said rod end and permit insertion of said rod end in an aperture of an operating member or the like.

References Cited

UNITED STATES PATENTS

| | | | |
|---|---|---|---|
| 2,043,218 | 6/1936 | Anderson | 287—58 |
| 2,893,766 | 7/1959 | Meyer | 287—58 |
| 2,925,295 | 2/1960 | Boehlow | 287—93 |

FOREIGN PATENTS

| | | |
|---|---|---|
| 819,045 | 8/1959 | Great Britain. |
| 900,858 | 7/1962 | Great Britain. |
| 1,202.586 | 10/1965 | Germany. |

CARL W. TOMLIN, *Primary Examiner.*

A. V. KUNDRAT, *Assistant Examiner.*